United States Patent [19]
Brandt et al.

[11] Patent Number: 5,309,255
[45] Date of Patent: May 3, 1994

[54] LASER BEAM ENVIRONMENT ISOLATION HOUSING

[75] Inventors: Michael B. Brandt, Walworth; Paul D. Askins; David P. Trauernicht, both of Rochester, all of N.Y.

[73] Assignee: Eastman Kodak Company, Rochester, N.Y.

[21] Appl. No.: 843,491

[22] Filed: Feb. 28, 1992

[51] Int. Cl.5 .............................................. H04N 1/04
[52] U.S. Cl. ..................... 358/471; 358/474; 358/494
[58] Field of Search ............... 358/471, 474, 494, 296; 385/88, 92, 93, 94; 346/108; H04N 1/04

[56] References Cited

U.S. PATENT DOCUMENTS

| | | | |
|---|---|---|---|
| Re. 31,847 | 3/1985 | Luckey | 250/327.2 |
| 4,616,267 | 10/1986 | Horikawa | 358/474 |
| 4,749,250 | 6/1988 | Carter | 385/93 |
| 4,758,848 | 7/1988 | Nakano | 346/108 |
| 4,860,116 | 8/1989 | Nakajima | 358/494 |
| 5,057,943 | 10/1991 | Takahashi | 358/474 |

OTHER PUBLICATIONS

"The Effects of Wavelength and Luminance on Visual Modulation Transfer", Proc. Colloquium on Performance of the Eye at Low Luminance, Excerpta Medica, International Congress, Serial 125 (1965).

Primary Examiner—Edward L. Coles, Sr.
Assistant Examiner—Kim Yen Vu
Attorney, Agent, or Firm—William F. Noval

[57] ABSTRACT

A laser imaging apparatus, such as a laser scanner or laser printer, includes a gas or diode laser which produces a laser beam and an optical system for directing the laser beam onto a object to be scanned or printed. The laser beam is encompassed in a sealed housing from the laser's output to a point at which the beam is no longer subjected to turbulent environment in order to eliminate laser beam pointing instabilities resulting from a turbulent environment caused by thermal sources, cooling fans, etc.

3 Claims, 3 Drawing Sheets

LASER BEAM ENVIRONMENT ISOLATION HOUSING

FIELD OF INVENTION

This invention relates, in general, to laser imaging apparatus, such as laser scanners or laser printers and, more particularly, to a laser imaging apparatus, including a laser whose laser beam output is completely encompassed by a sealed housing to eliminate pointing instabilities which result from environmental turbulence due to laser heating/cooling fans, etc.

DESCRIPTION OF THE PRIOR ART

Lasers are widely used in laser imaging apparatus, such as laser scanners, laser printers and storage phosphor imaging systems. In a storage phosphor imaging system, as described in U.S. Pat. No. Re. 31,847, reissued Mar. 12, 1985, inventor Luckey, a storage phosphor sheet is exposed to an image-wise pattern of short wavelength radiation, such as x-ray radiation to record a latent x-ray image in the storage phosphor sheet. The latent x-ray image is read out by stimulating the phosphor with a relatively long wavelength stimulating radiation, such as red or infrared light. Upon stimulation, the storage phosphor releases emitted radiation of an intermediate wavelength, such as blue or violet light, in proportion to the quantity of x-ray radiation that was received. To produce a signal useful in electronic imaging, the storage phosphor sheet is scanned in a raster pattern by a laser beam deflected by an oscillating or rotating scanning mirror. The emitted radiation from the stimulated storage phosphor is sensed by a photodetector to produce an electronic x-ray image signal. In one type of storage phosphor reader, the storage phosphor sheet is placed on a translation stage and is translated in a page scan direction past a laser beam that is repeatedly deflected in a line scan direction to form a laser beam scanning raster.

In such a system, the environment through which the laser beam passes may be turbulent. This turbulence results from the proximity of the beam to thermal sources, such as the laser, cooling fans and the like. This turbulent environment creates dynamic and chaotic inhomogeneities in the refractive index of the environment which, in turn, causes pointing instability of the laser beam. This pointing instability of the laser beam will create objectionable random image artifacts known as banding in a scanned image. An optical system designed to reduce the sensitivity to such a pointing instability could not totally compensate for the problem. This results because the pointing instability does not occur at a unique location in space, which could be made optically conjugate to the plane of the scanned object, but rather occurs over a substantial length of the laser beam.

SUMMARY OF THE INVENTION

According to the present invention, there is provided a laser imaging system, including a diode or gas laser which produces a laser beam which is unaffected by environmental turbulence, thus, eliminating pointing instabilities caused by such turbulence. According to a feature of the present invention, a sealed housing completely encompasses the laser beam from the laser's output mirror to a point at which the beam is no longer subjected to the turbulent environment. Thus, image artifacts such as banding are substantially eliminated.

DESCRIPTION OF THE PREFERRED EMBODIMENTS

Figure 1:
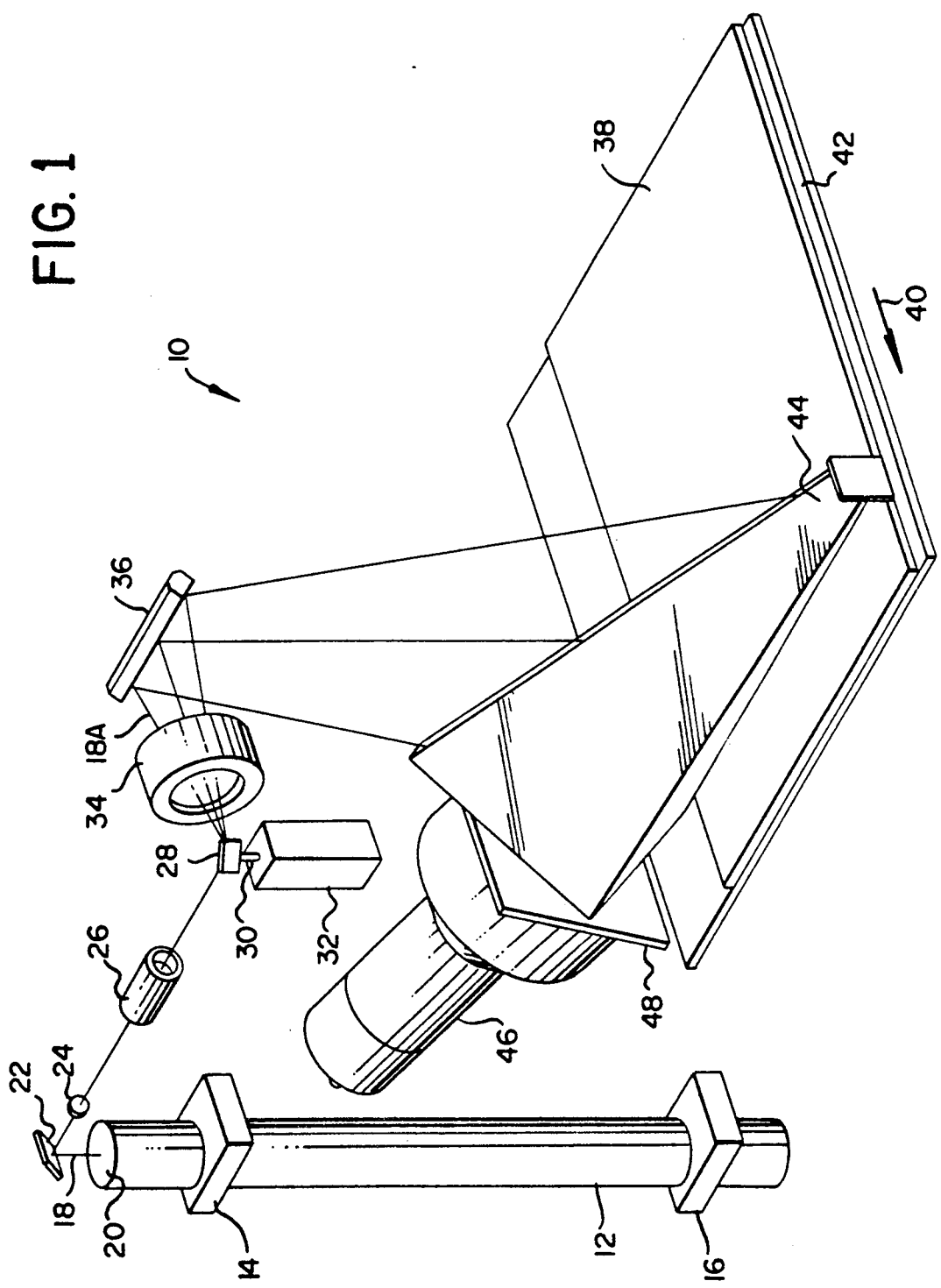
FIG. 1 is a diagrammatic perspective view of a storage phosphor laser imaging system.

Referring now to FIG. 1, there is shown a storage phosphor laser imaging system in which the present invention is incorporated. Although a laser imaging system incorporating storage phosphors is described herein, it will be understood that the present invention is also applicable to other laser imaging systems, such as film or document scanners in which a laser beam scans a transparent or reflective information medium to produce an image which is photoelectrically detected to create an electrical image signal. The invention is also applicable to laser printers in which a modulated laser beam is used to expose photoresponsive media, such as film, to produce a fixed visible image of an electronic image signal, such as an electrical x-ray image signal.

As shown in FIG. 1, laser imaging system 10 includes a vertically disposed gas laser 12 supported on brackets 14 and 16. Gas laser 12 may, for example, be a helium neon gas laser. Laser 12 produces a laser beam 18 at its output mirror face 20 which is reflected from mirror 22 and directed through optical elements 24 and 26 to scanning mirror 28. Scanning mirror 28 is mounted for oscillating motion on shaft 30 of a motor 32. Mirror 28 causes laser beam 18 to scan in a repetitive line pattern. The scanning beam 18A is directed by optical element 34 and mirror 36 onto a storage phosphor 38 which is translated in the direction of arrow 40 by means of translation mechanism 42. Storage phosphor 38 has a latent image, such as a latent x-ray image, which is stimulated by laser scanning beam 18A.

Light emitted from storage phosphor 38 is collected by collector mirror 44 and detected by photodetector 46, such as a photomultiplier tube. Filter 48 only passes emitted radiation for detection by photodetector 56 and filters out stimulating radiation of laser 12. Photodetector 46 produces an electrical image signal which may be stored in memory, reproduced on a video monitor, or reproduced on paper or film by a laser printer or a multiformat camera.

The storage phosphor laser imaging system 10 incorporates a high power HeNe laser 12, mounted in a vertical orientation, such that the laser beam 18 is directed in an upward direction. The laser 12 generates a sufficient amount of heat to warm the surrounding air and create thermal air currents which rise in a turbulent fashion (similar to the smoke rising from a lit cigarette), along the laser beam 18, and disturb the pointing stability of the laser beam 18. The pointing stability becomes disturbed because the beam 18 must pass through air in which the index of refraction is no longer homogeneous, but now possesses dynamic and chaotic refractive index gradients. This is the same effect which one notices on a hot summer day when looking out over a long stretch of black asphalt. This is because the refractive index of air (approximately 1.00027 at 632.8 nm for typical ambient environments) is not a physical constant; rather, it is a function of pressure (P), temperature (T), and relative humidity (H). For small perturbations, the sensitivity of the index of refraction (n) of air to these parameters is . . .

dn/dP is approximately $9 \times 10^{-6}$ per inch of mercury dn/dT is approximately $1 \times 10^{-6}$ per 10 degrees Fahrenheit dn/dH is approximately $1 \times 10^{-7}$ per 10% relative humidity Measurements of short term beam pointing instability indicated that the laser beam pointing was varying on the order of 100 microradians peak to peak. This amount of pointing instability results in 19 microns of raster line shift at the plane of storage phosphor 38, for this system. This amount of raster line shift is two orders of magnitude greater than that which should be maintained in order to keep the contrast modulation of the associated banding artifact below the threshold sensitivity of the eye (Reference: Van NES, F. L. and M. A. Bouman: "The Effects of Wavelength and Luminance on Visual Modulation Transfer," Proc. Colloquium on Performance of the Eye at Low Luminance, Excerpta Medica, International Congress, Serial 125 (1965)).

Figure 2:
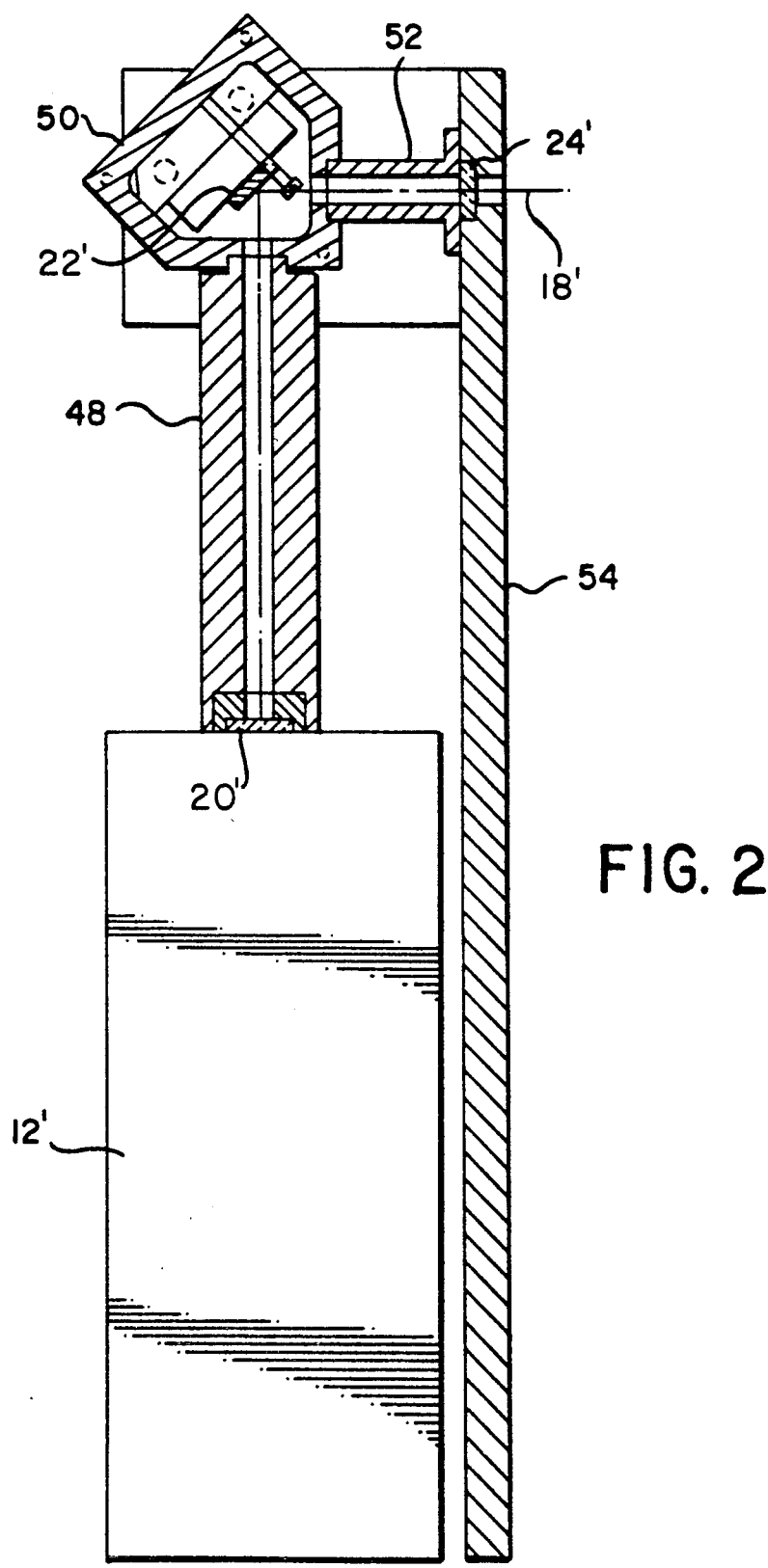
FIG. 2 is a side elevational sectional view of an embodiment of the present invention.

According to the present invention, as shown in FIG. 2, this pointing instability problem is solved by completely encompassing the laser beam 18', from the laser's output mirror face 20' to a point at which the beam 18' is no longer subjected to the turbulent environment, within a sealed housing including input tube 48, folding mirror enclosure 50 and output tube 52. Insert tube 48 encloses laser beam 18' from face 20' to enclosure 50. Enclosure 50 encloses folding mirror 22'. Tube 52 encloses laser beam 18' from enclosure 50 to mirror 24'. If necessary, this solution may require the removal of the faceplate and shutter mechanism from the laser housing, provided by the laser's manufacturer, in order to access the laser output window face 22. Considerable environmental turbulence exists within the laser manufacturer's laser housing; thereby, requiring this modification.

In FIG. 2, laser 12 is mounted outside a frame including frame plate 54 which encloses the laser imaging system components shown in FIG. 1.

Figure 3:
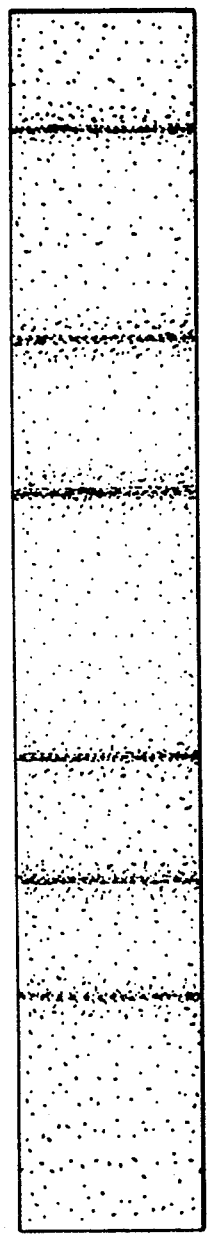
FIGS. 3 and 4 are illustrative views showing the scanned image of a uniform field, before and after incorporation of the present invention.
Figure 4:
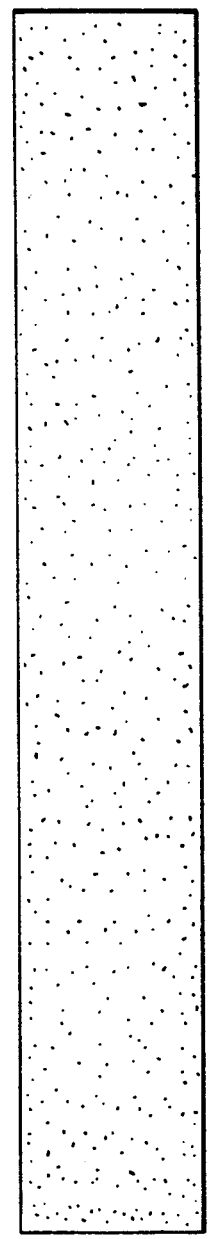

FIGS. 3 and 4 are illustrative views which are useful in explaining the advantages of the present invention. As shown in FIG. 3, a uniformly irradiated storage phosphor is read out by means of apparatus similar to that shown in FIG. 1 without the laser beam housing of the present invention. Laser beam pointing instability caused by thermal turbulence around the laser output result in banding artifacts in a hard copy reproduction of the read out image. (See dark vertical lines indicated by arrows in FIG. 3).

Another uniformly irradiated storage phosphor is read out by means of apparatus similar to that shown in FIG. 1, but incorporating the laser beam housing according to the present invention shown in FIG. 2. As shown in FIG. 4, a hard copy reproduction of the read out image is substantially uniform in tonal value, the banding artifacts shown in FIG. 3 being eliminated.

Industrial Application

The disclosed laser imaging system has industrial application in laser scanners, film digitizers, storage phosphor readers and laser printers.

Although the invention has been described in detail with particular reference to a preferred embodiment thereof, it will be understood that variations and modifications can be effected within the spirit and scope of the invention as described above and is defined in the appended claims.

What is claimed is:

1. Storage phosphor reader apparatus comprising:
    a laser mounted in a laser housing for producing a laser beam which is directed along a path in which beam pointing instabilities caused by environmental turbulence may occur;
    means for scanning said laser beam along a line scanning beam;
    means for transporting a storage phosphor containing a latent image past said line scanning beam in a direction perpendicular thereto so that said storage phosphor is scanned in a raster pattern;
    means for detecting light emitted by said storage phosphor and converting said emitted light into an electrical image signal which is representative of the latent image in said storage phosphor; and
    sealed housing means for enclosing said laser beam in the vicinity of said laser to prevent the laser beam produced by said laser from environmental turbulence caused pointing instabilities.

2. The storage phosphor reader apparatus of claim 3 wherein said laser is mounted perpendicularly and produces an upwardly directed laser beam, and wherein said housing means includes a sealed enclosure for enclosing said laser beam in the region extending upwardly from said laser.

3. The storage phosphor reader apparatus of claim 2, including an optical element spaced from said laser housing along said laser beam path for redirecting said laser beam in another path intersecting said laser beam path and towards said scanning means, and wherein said housing means includes (a) an enclosure for enclosing said optical element, (b) a sealed input laser beam housing extending from the output of said laser housing to said optical element enclosure, and (c) a sealed output laser beam housing extending along said laser beam path from the output of said optical element enclosure.

* * * * *